US006214292B1

(12) United States Patent
Las Navas Garcia

(10) Patent No.: US 6,214,292 B1
(45) Date of Patent: Apr. 10, 2001

(54) SAMPLE AUTO-LOADER FOR USE WITH AN ANALYTICAL COMBUSTION FURNACE

(76) Inventor: Jose Maria Las Navas Garcia, Parque Infantas, chalet 150, Valdemorillo Madrid (ES)

( * ) Notice: Subject to any disclaimer, the term of this patent is extended or adjusted under 35 U.S.C. 154(b) by 0 days.

(21) Appl. No.: 09/108,699

(22) Filed: Jul. 1, 1998

(51) Int. Cl.[7] .................... G01N 31/00

(52) U.S. Cl. .................... 422/63; 422/65; 422/78; 422/80; 422/233

(58) Field of Search .................... 422/63, 65, 78, 422/80, 98, 233, 236, 237

(56) References Cited

U.S. PATENT DOCUMENTS

| | | | |
|---|---|---|---|
| 4,238,450 | 12/1980 | Bredeweg et al. . | |
| 4,559,201 | 12/1985 | Yamada et al. . | |
| 5,071,626 * | 12/1991 | Tuller | 422/98 |
| 5,096,675 | 3/1992 | Park . | |
| 5,112,579 | 5/1992 | Dunn et al. . | |
| 5,113,770 * | 5/1992 | Godbe et al. | 110/187 |
| 5,192,506 | 3/1993 | Kureshy et al. . | |
| 5,314,662 | 5/1994 | Hemzy et al. . | |
| 5,366,901 | 11/1994 | Bergli et al. . | |
| 5,395,586 | 3/1995 | Hemzy et al. . | |

* cited by examiner

*Primary Examiner*—T. Tung
*Assistant Examiner*—Dwayne K. Handy
(74) *Attorney, Agent, or Firm*—Bazerman & Drangel, PC

(57) ABSTRACT

An apparatus for moving a series of boats loaded with samples into one end of a furnace, testing each sample by heating it to the point where the gases to be analyzed are released and discarding the boat with the remaining ashes, while maintaining the sample and the gasses emitted by the sample free from atmospheric contamination in the furnace. The sample is initially positioned in the furnace by use of a pushing mechanism in the form of a rod driven by a step motor. The boat remain in position after the gasses are driven from the sample, until another sample is introduced. The boat with the new sample pushes the boat with the ashes of the previous sample towards a means for automatic extraction of the boat from the furnace.

5 Claims, 8 Drawing Sheets

C-D

SAMPLE AUTO-LOADER FOR USE WITH AN ANALYTICAL COMBUSTION FURNACE

BACKGROUND OF THE INVENTION

The present invention relates to an automatic loader used for loading and unloading samples into a resistance furnace, for moving samples for analysis into and out of a high temperature furnace while protecting the sample from contamination by ambient atmosphere.

A common method of analyzing the content of a sample is to place the sample in a furnace at a sufficient temperature that gases are driven from the sample. The gases are then analyzed to obtain the desired information. Any ash or other residue then remaining from the sample is discarded. Such furnaces can be used to analyze any gas which can be obtained by burning or exposing a sample in a furnace to high temperature to obtain information such as carbon or sulfur content of a sample.

A conventional furnace to perform such analysis may be a resistance furnace having an elongated central tube in which the sample is positioned at the tube midpoint. The interior of the tube is flooded with a gas such as oxygen to isolate the sample from the atmosphere and to standardize the interaction with the sample. The mid point is the point of highest temperature, and thus the point where the gasses are driven or burned from the sample. The gasses to be analyzed are then drawn from one end of the furnace. The sample is normally in a crucible or boat which is placed in and removed from the furnace by hand through the same opening in the furnace. A number of attempts have been made to automate the process of introducing the sample into a furnace, drawing out of the gasses for analyzes and, thereafter, removing the remaining ashes and the crucible which carried the sample. For example, U.S. Pat. No. 5,314,662 to Hemzy, et al., and U.S. Pat. No. 5,395,586 to Hemzy, et al., show systems for automatically pushing into the furnace and retrieving a sample in a crucible from the same end of the furnace.

SUMMARY OF THE INVENTION

The present invention relates to an apparatus for moving a series of boats loaded with samples into one end of a furnace, testing each sample by heating it to the point where the gases to be analyzed are released and discarding the boat with the remaining ashes, while maintaining the sample and the gasses emitted by the sample free from atmospheric contamination in the furnace. In the present invention, this is accomplished by automatically pushing the boat with the sample to the center of the furnace, allowing any gasses to be driven out of the sample and then removing the sample through the opposite end of the furnace.

The sample is initially positioned in the furnace by use of a pushing mechanism in the form of a rod driven by a step motor. Since the remains of the samples in the previous boat have been reduced as far as possible by the action of the furnace, in most cases their continued existence in the furnace does not affect analysis of any later introduced sample. In accordance with the present invention, under such circumstances the boats remains in position after the gasses are driven from the sample, until another sample is introduced. The boat with the new sample pushes the boat with the ashes of the previous sample towards a means for automatic extraction of the boat from the furnace. However in testing certain materials, the spent ashes, while not adding additional gasses, may absorb gasses from the sample being analyzed. In such situations, instead of keeping the spent samples and their boats in a line in the furnace to position the boats for removal, the pushing mechanism which positions the sample in the center of the furnace, may be reintroduced into the furnace and extended to a greater length after the gasses are driven out of the sample, so that the boat containing the spent ashes is removed from the far end of the furnace.

The length of time that the sample remains at the hottest point of the furnace is determined by the gasses emitted by the sample under test. That is, when the sensors doing the analysis no longer sense any additional gas emitted by the sample, the cycle for eventual removal of the spent sample can be activated.

The furnace is sealed against outside gasses by either or both the introduction of specific gasses under positive pressure and by mechanical means.

DETAILED DESCRIPTION OF THE PREFERRED EMBODIMENTS

Figure 1:
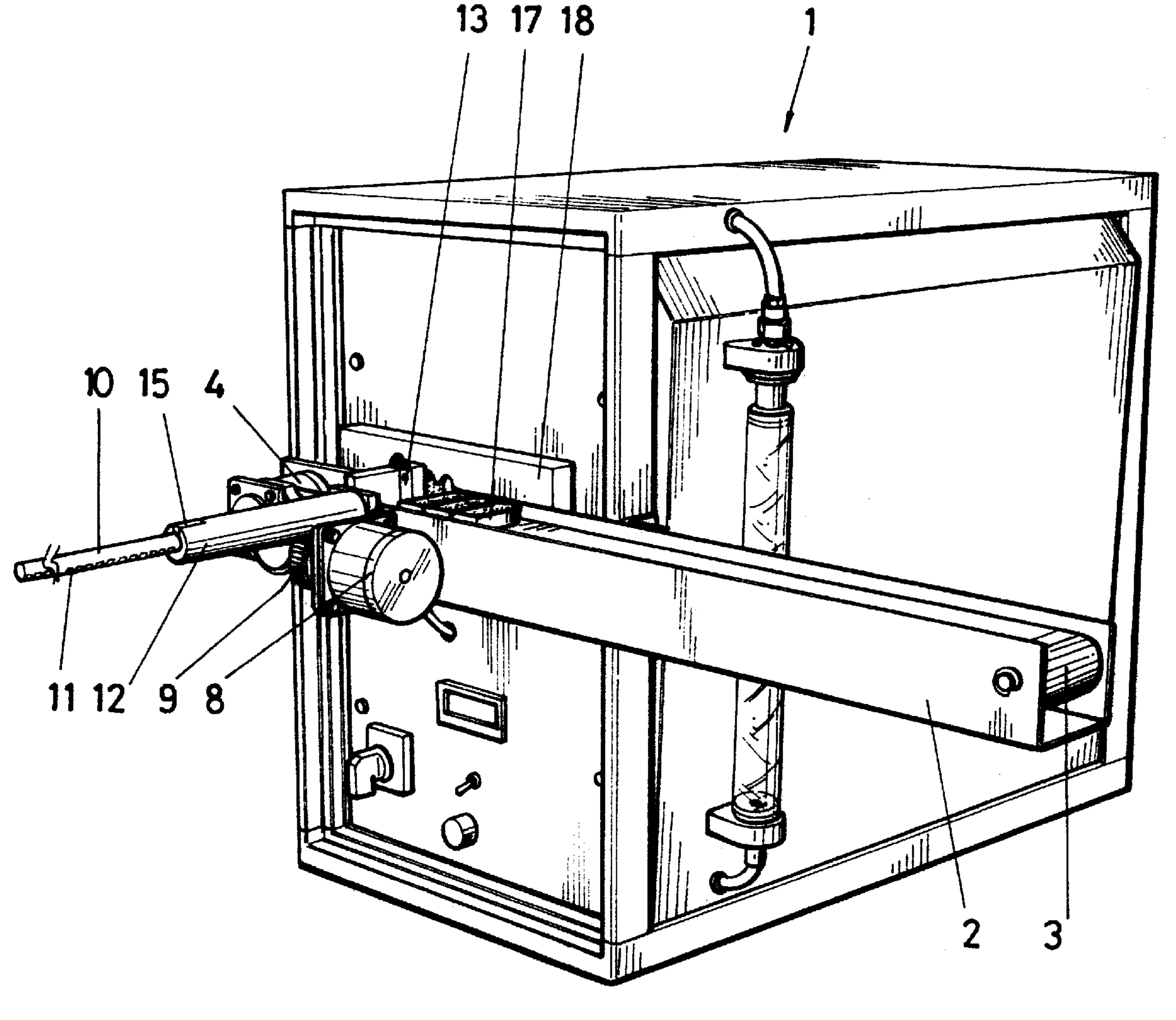
FIG. 1 is a prospective view of the front end of a resistance furnace in accordance with the first embodiment of the present invention.
Figure 3:
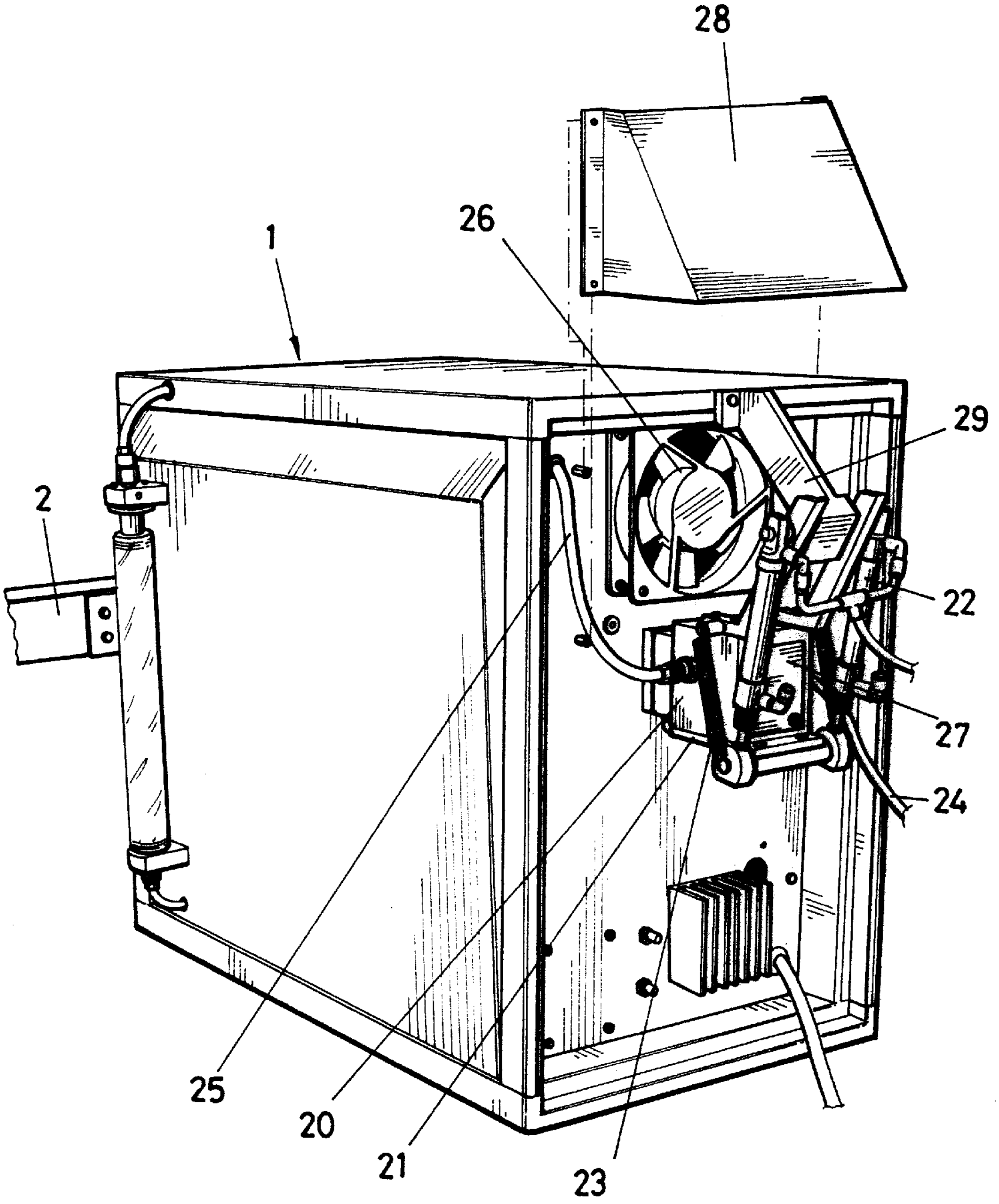
FIG. 3 is a prospective view of the rear end of a resistance furnace in accordance with the present invention.
Figure 4:
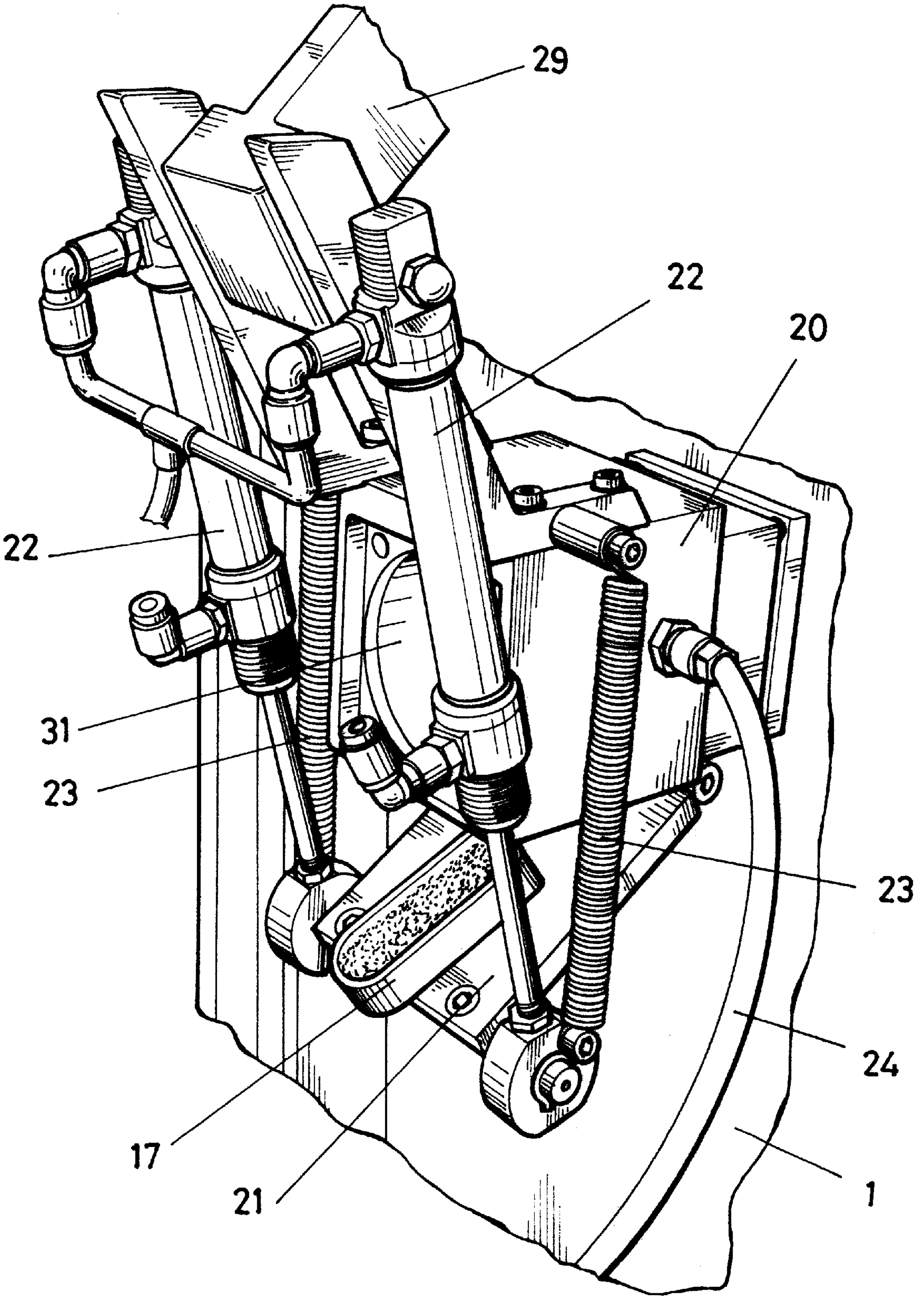
FIG. 4 is a prospective view of the mechanism for removal of spent samples without its cover plate.
Figure 5:
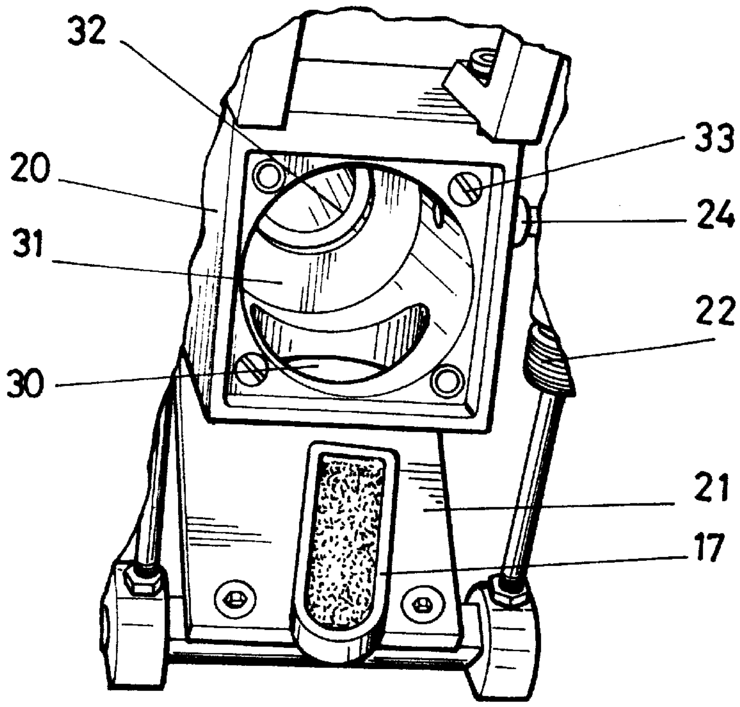
FIG. 5 is another prospective view of the mechanism for removal of spent samples without its cover plate.
Figure 6:
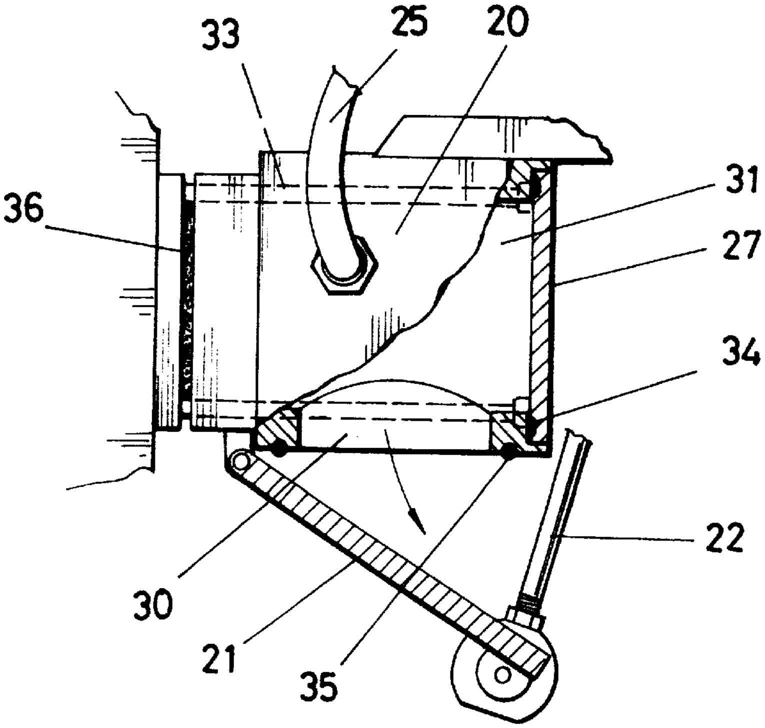
FIG. 6 is a partial cut-away side view of the mechanism for removal of spent samples.
Figure 7:
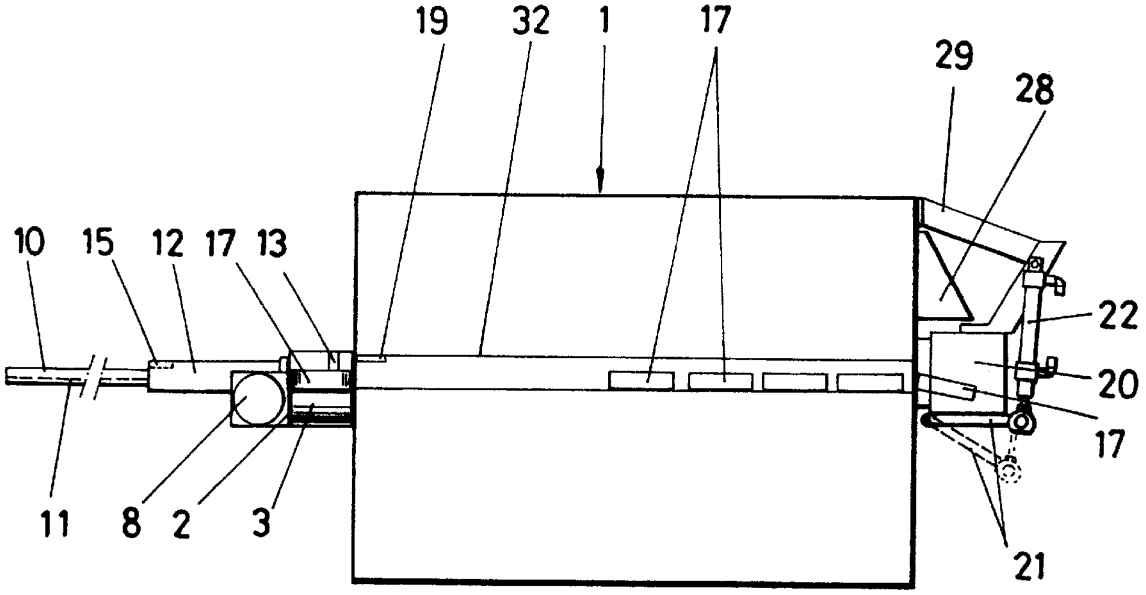
FIG. 7 is a schematic view of the furnace including a loading and unloading means in accordance with the present invention.
Figure 8:
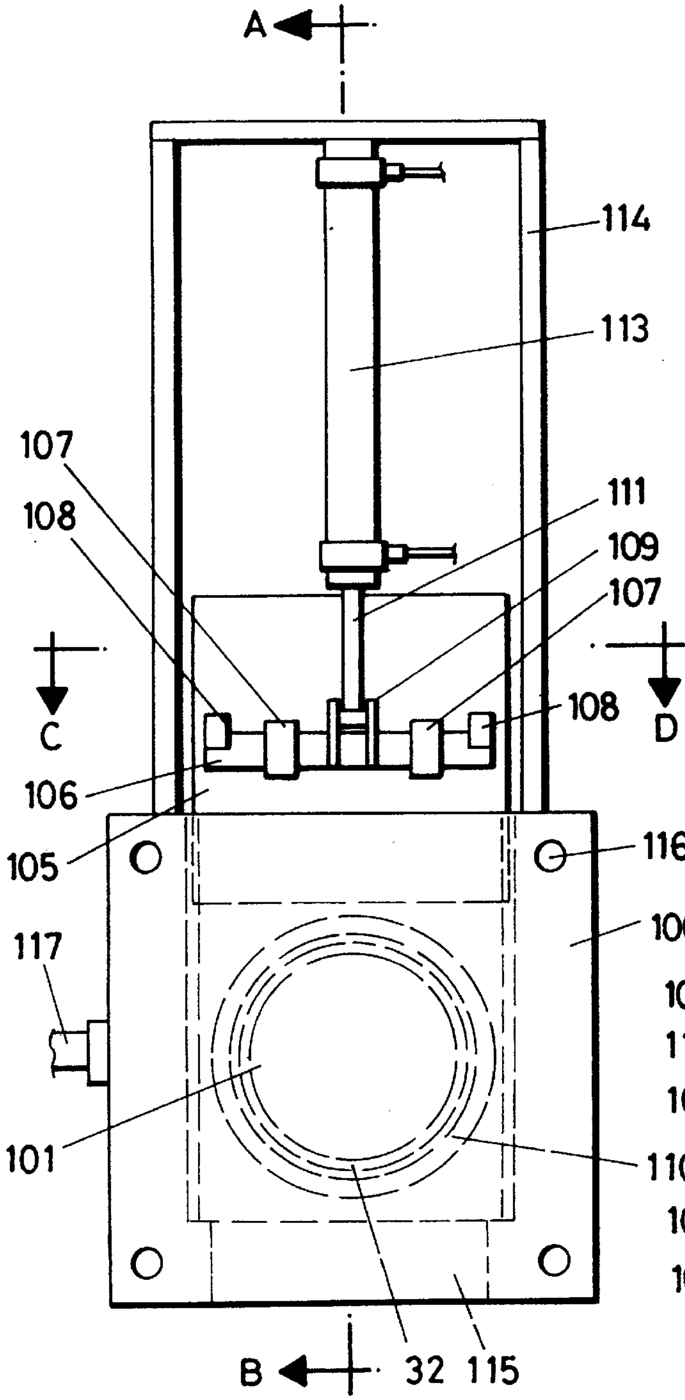
FIG. 8 is a front view of a door over the entry port of furnace in accordance with the second embodiment of the present invention.
Figure 9:
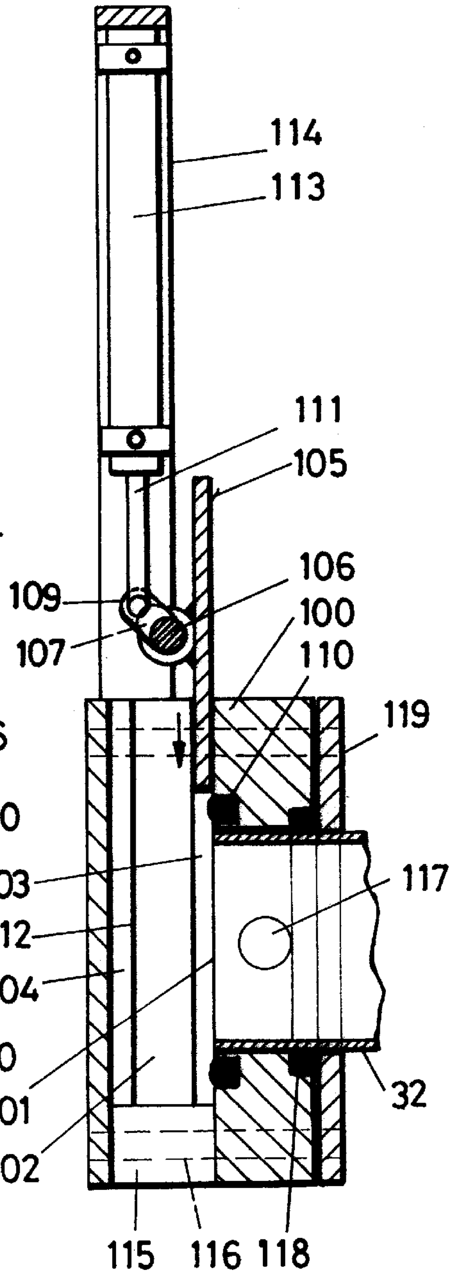
FIG. 9 is a cross section view taken along plane A–B of FIG. 8, showing the sealing mechanism of the second embodiment of the present invention in an open position.
Figure 10:
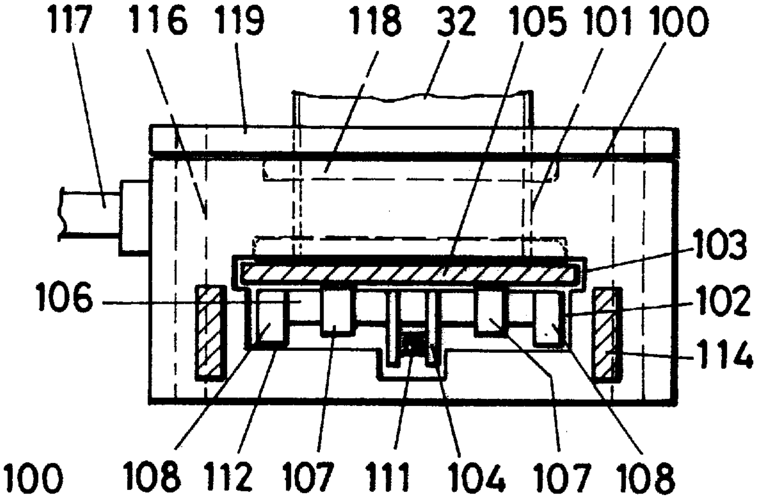
FIG. 10 is a cross-sectional view taken along plane C–D of FIG. 8, showing the second embodiment of the present invention.
Figure 11:
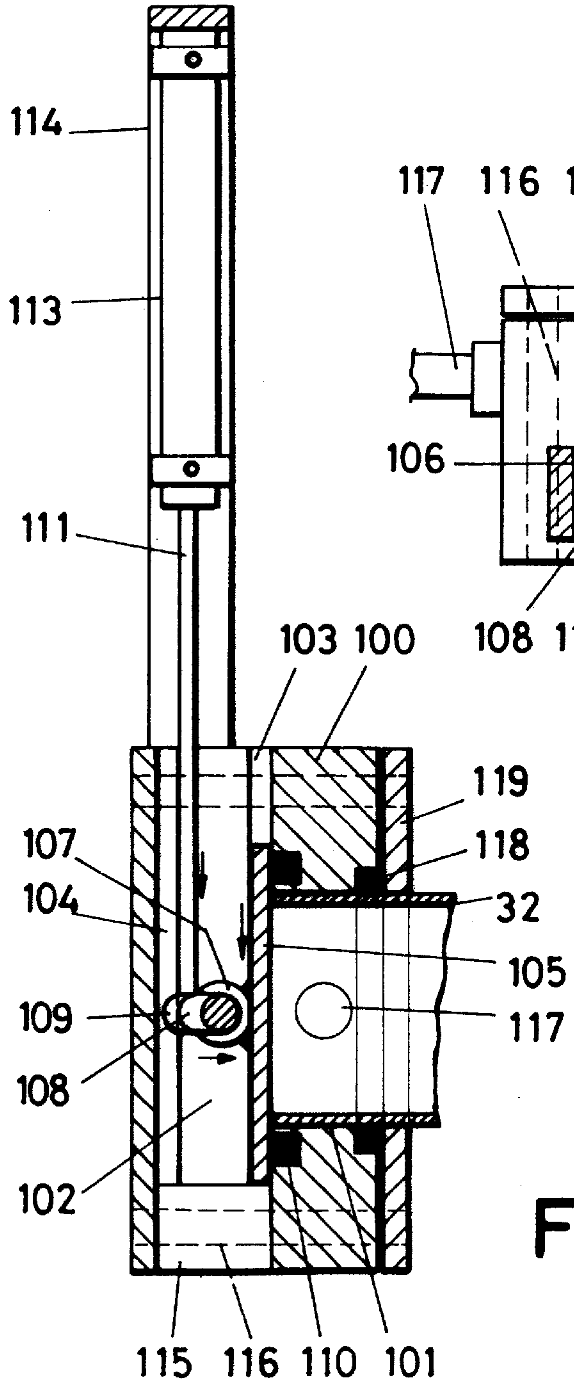
FIG. 11 is a cross section view taken along plane A–B of FIG. 8, showing the sealing mechanism of the second embodiment of the present invention in a closed position.

The present mechanism may be used with any analytical furnace which generates sufficient temperature to burn or otherwise cause a sample to emit gasses. It could, for example, be a high temperature resistance furnace 1 such as seen in FIGS. 1, 3 and 7.

As with any such analysis, the individual samples are weighed prior to introduction into the furnace so that the results of the testing can be calculated in terms of weight. The sample may be weighed prior to being placed in its boat or the boat may be weighed with and without the sample. The boat 17 containing the sample is introduced into the furnace through a loading mechanism 2 having a belt 3 which moves the boat 17 to an opening 16 in the furnace. The belt 3 is driven by stepping motor 4 through gears 5 and 7 and timing belt 6. To assure against contamination and errors in measurement, the interior of the furnace is flooded by a gas under pressure introduced through conduit 18 to orifice 19 to assure that the interior of the furnace and more importantly the gasses emitted by the sample are not contaminated by the outside atmosphere. For most analyses, the carrier gas would be oxygen, but for some analysis, such as nitrogen analysis, it may be an inert gas or a combination of gasses.

Figure 2:
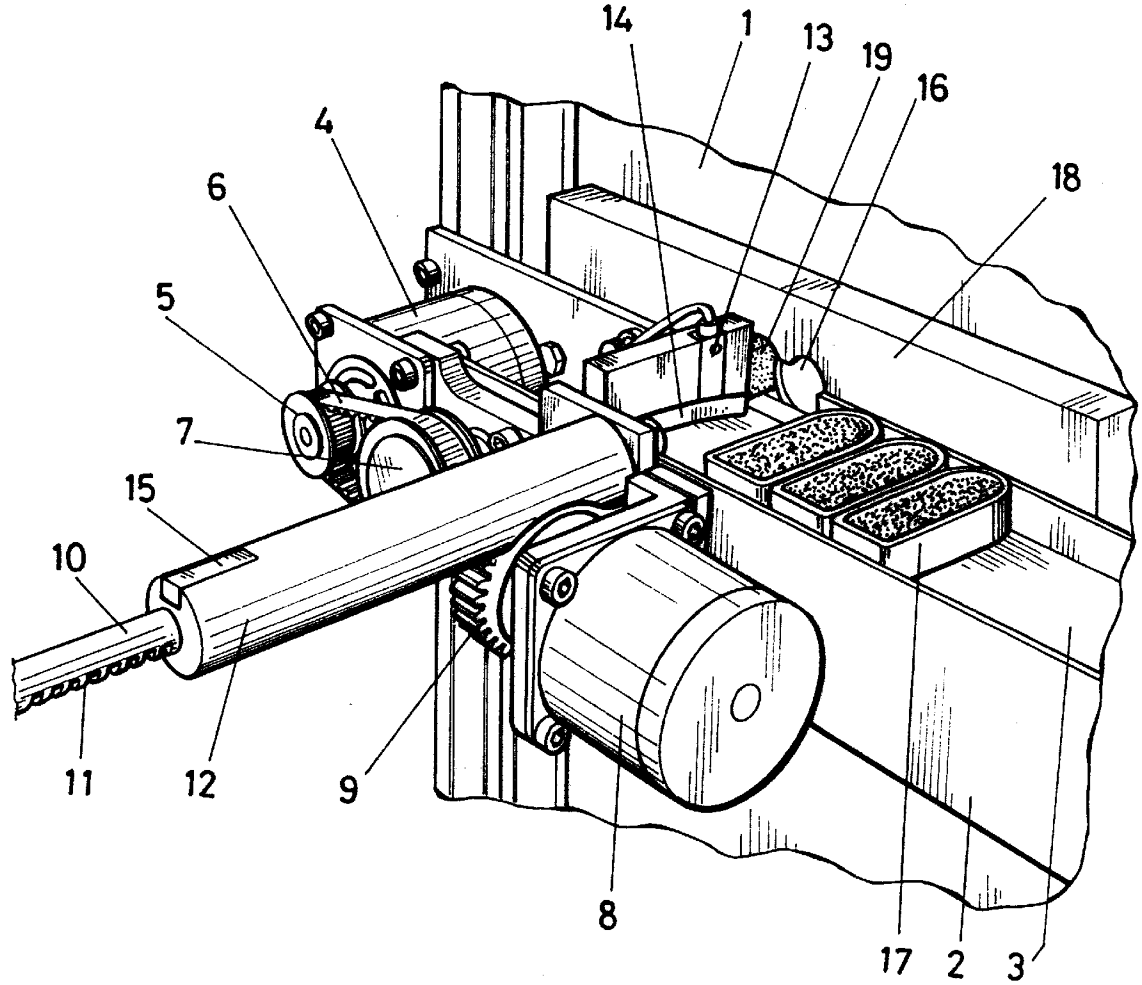
FIG. 2 is a partial prospective view of the front end in accordance with the first embodiment of the present invention.

As seen more clearly in FIG. 2, when a boat 17 is moved in position by belt 3 opposite the opening 16, the boat 17 contacts metal strip 14, which closes a switch 13. The closing of the switch 13 emits a signal to a computer system guiding the entire analysis cycle. Upon activation by switch 13, the stepping motor 4 is deactivated and thus belt 3 stops until the end of the analyzes cycle.

Rod 10 has teeth 11 along at least part of its outer surface to allow it to interact with gear 9 and stepping motor 8 to move the sample boat 17 into the furnace 1. Rod 10 is mounted in sleeve 12 which has a cut away portion at gear 9 to allow interaction between the rod 10 and the motor 8. Upon closing of switch 13, motor 8 is activated and drives gear 9. Rotation of gear 9 drives teeth 11 of rod 10 forward and, thus, rod 10 and boat 17 move into the furnace tube 32 which runs through the length of furnace 1. Sensor 15 on sleeve 12 controls the extension of rod 10 and thus the position of boat 17. The sensor 15 may be any conventional type which can sense when rod 10 has extended sufficiently to position the boat 17 in the center of furnace tube 32, i.e, the hottest portion of the furnace. The rod 10 then retracts and the gasses are burnt or driven from the sample in boat 17. The gasses burnt or driven from the sample are drawn from the furnace through exit box 20 and exhaust tube 25 by a suction pump (not shown) to conventional analysis apparatus (not shown).

Depending on whether or not the gasses driven from a sample will interact with the spent sample, the furnace has two modes of operation. If there is no interaction between the gasses emitted by the sample and the spent samples, the introduction of a new sample and boat 17 is used to push the boats 17 containing spent samples toward a mechanism to remove the them from the furnace. More specifically, as each boat 17 enters the furnace 1 and is positioned at the mid-point, it pushes the prior boats 17 toward exit box 20. During the period when gas is being driven from a new sample, exit box 20 is hermetically sealed to assure that all emitted gasses are analyzed without loss of gasses through exit box 20. After enough boats 17 have been analyzed in the furnace 1 so, the first spent boat 17 is pushed into the interior 31 of exit box 20. Exit box 20 will open for removal of the spent boat 17 after the gasses have been driven from the last sample and delivered to the analysis equipment (not shown).

Support bar 29 holds exit box 20 in position. Support bar 29 is attached to furnace 1 at the end opposite from where boat 17 is initially placed in the furnace 1 and holds exit box 20 in position. Support bar 29 has mounted on it pneumatic cylinders 22 and springs 23 for operating the exit box 20 to allow ejection of the spent samples. Springs 23 are attached at their opposite ends to exit door 21. During analysis, exit door 21 of exit box 20 is held tightly closed by springs 23. Under pressure of spring 23, O-ring 35 seals the door 21 to the sides of the exit box 20 to assure that gasses to be analyzed will not leak from the exit box 20 while being drawn into tube 25. Upon the complete removal of the gasses for analysis, door 21 at the bottom of exit box 20 is opened by the action of pneumatic cylinders 22 which overcomes springs 23. Since door 21 is situated at the bottom of exit box 20, the spent sample and the boat 17 simply falls out of the exit box 20. During the period when the door 21 is driven open by the cylinders 22, oxygen is flushed through the exit box 20 under pressure from tube 24 to prevent air entering into the furnace 1 and, thereby contaminating the analysis. After the boat 17 falls from exit box 20, the pneumatic cylinders 22 are released and the springs 23 acts to close door 21 and seal exit box 20. The other sides of exit box 20 are also constructed to seal the exit box 20 during analysis of a sample. The cover plate 27 forming the end of exit box 20 is mounted with an O-ring 34 and the entire assembly is force fit by screws 33 that pulls the exit box 20 against the body of a collapsible O-ring 36.

If gasses emitted from the sample will react with spent samples, the rod 10 may be automatically operated in a two-step fashion, first positioning the boat 17 in the center of the furnace and withdrawing out of the furnace, and then after all gasses are driven from the sample as measured by the analyzing equipment, re-extending rod 10 for the length of tube 32, pushing boat 17 into the interior 31 of exit box 20. The rod 10 is withdrawn and the mechanism of exit box 20 is then activated resulting in removal of the spent sample in boat 17 through door 21. A fan 26 and hood 28 are used to cool the exit box 20.

A second embodiment is shown in FIGS. 8–11. In this embodiment the entry way for a sample into the furnace is protected by a sliding door 105 controlled by cylinder 113 through rod 111 The sliding door is mounted in sliding door frame 100 formed from one or more pieces of metal. The sliding door frame 100 is mounted on furnace 1 so as to interconnect with entranceway 101 of tube 32 of furnace 1 by screws (not shown) which pass through opening 116 on sliding door frame 100. The screws in holes 116 pull end plate 119 against O-rings 118 forming a seal across the furnace combustion tube 32. Cylinder 113 is mounted on framework 114 which is attached to the sliding door frame 100. The sliding door frame 100 forms an open box 102 within which sliding door 105 is positioned when the door 105 is closed. The box 102 has grooves 103 in which the sliding door 105 is mounted. Prior to rod 10 positioning boat 17 in furnace 1, the pneumatic piston 113 is activated, raising rod 111 and, thereby, pulling sliding door 105 away from entry way 101 and up thereby giving access to tube 32 through an opening 110 in end plate 115. Rod 111 is attached to door 105 through pin 109, lever arm 107 supports and allows the rotation of shaft 106 and thereby pressing cam 108 against O-ring 110.

After the boat 17 is placed in the center of furnace 1 and rod 10 is withdrawn, the piston 113 pushes rod 111 downward, letting door 105 fall to the bottom of groove 103 in cavity 112. As piston 113 continues to push rod 111 downward, arm 107 is rotated after the sliding door 105 reaches the bottom of groove 103, thereby forcing sliding door 105 against O-rings 110 sealing furnace entranceway 101 in tube 32.

Inlet opening 117 allows insertion of gasses under pressure into entranceway 101 to prevent contamination when the sliding door 105 is open and to provide the appropriate environment for driving the gasses out of the sample. Once a sample has been analyzed and no further gasses are being emitted by the sample, a new analysis cycle begins with the piston 113 opening sliding door 105.

It is understood that the present embodiments described above are to be considered as illustrative and not restrictive.

It will be obvious to those skilled in the art to make various changes, alterations and modifications to the invention described herein. To the extent that these variations, modifications and alterations depart from the scope and spirit of the appended claims, they are intended to be encompassed therein.

I claim:

1. A horizontal, analytic combustion furnace having a sample loader and unloader comprising:

a. a furnace;

b. sample entry port positioned at the forward end of the furnace;

c. sample discharge port positioned at the rear end of the furnace;

d. a first boat containing a sample to be tested;

e. means for positioning said first boat in front of said entry port;

f. a means for moving said first boat through said entry port directly to the hottest portion of said furnace and after a sample has been fully combusted, moving said boat from the hottest portion of said furnace toward the discharge port;

g. means for determining when said sample has been fully combusted; and h. means for ejecting said boat.

2. A furnace according to claim 1 wherein the means for positioning the first boat moves the first boat toward the discharge port after the sample has been fully combusted by positioning a second boat at the hottest portion in the furnace where it originally positioned the first boat, thereby moving the first boat toward the discharge port.

3. A furnace according to claim 1 wherein the means for positioning a boat moves the first boat toward the discharge port after the sample in the first boat has been fully combusted by pushing said first boat to said discharge port.

4. An apparatus in accordance with claim 1 wherein a door is positioned in front of said entry port so as to seal the furnace from the atmosphere and means for automatically opening said door when the boat sample is to be positioned into the furnace.

5. The furnace of claim 1 wherein the means for moving the first boat through said entry port directly to the hottest portion of the furnace is an arm which extends to nearly the midpoint of the furnace.

* * * * *